March 7, 1939.                    M. FOX                    2,149,958

MEASURING SYSTEM

Filed April 11, 1938                3 Sheets—Sheet 1

INVENTOR.
Marvin Fox
BY
ATTORNEY.

March 7, 1939.  M. FOX  2,149,958

MEASURING SYSTEM

Filed April 11, 1938   3 Sheets-Sheet 2

INVENTOR
Marvin Fox
BY
ATTORNEY.

Patented Mar. 7, 1939

2,149,958

UNITED STATES PATENT OFFICE 2,149,958

MEASURING SYSTEM

Marvin Fox, New York, N. Y.

Application April 11, 1938, Serial No. 201,315

6 Claims. (Cl. 33—123)

This invention relates to improvements in devices and methods for measuring the area of irregular objects such as sheet material, in the nature of hides, skins and the like.

Broadly, it is an object of this invention to provide a system for measuring irregular surface areas such as that of skins, hides or the like, wherein a plurality of photoelectric cells, each in association with a separate source of light, are balanced as to electrical effects developed thereby to set the system; thereafter, the object to be measured is interposed between one of the photoelectric cells and its source of light, and the electrical effect developed by the other of the photoelectric cells balanced with that developed by the first cell, by varying the exposure surface of the other; the amount of such variation being directly translatable on a calibrated scale to indicate the surface area of the article being measured.

These and other advantages, capabilities and features of the invention will appear from the subjoined detailed description of one specific embodiment thereof illustrated in the accompanying drawings, in which—

Figure 1:
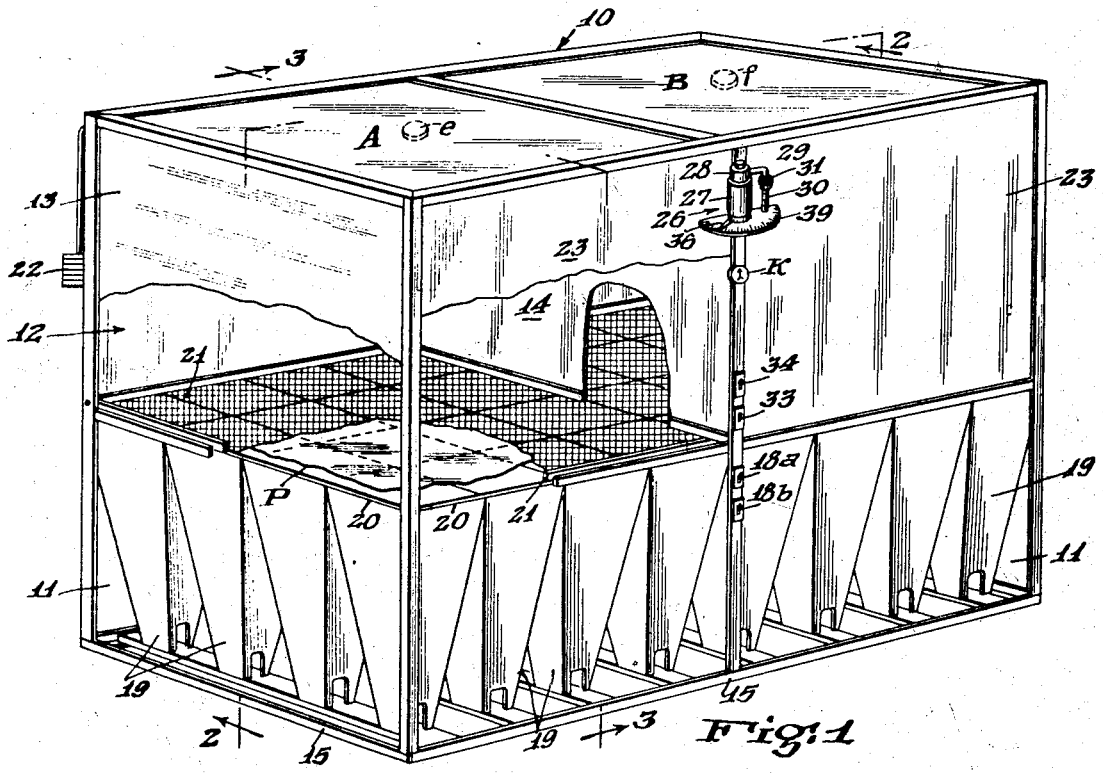
Figure 1 is a perspective view of the measuring apparatus.

Referring to the reference characters in the drawings, numeral 10 represents a cabinet having an open base section 11, in which is disposed light sources, and an enclosed chamber section 12, in which is disposed light sensitive elements. The walls 13 of the chamber section 12 are of opaque material, and an opaque curtain 14 extends transversely across the center of the chamber section to provide for a plurality of independently functioning units A and B, each having its own sensitive element acted upon by an associated light source for individual use; for joint use both of the light sensitive elements, electrically in parallel, are acted upon by their respective light sources, likewise electrically in parallel at the same time.

On the floor 15 of the base section are mounted in spaced relationship a series of lamps 16 grouped to form lamp banks c and d, the lamps in each bank being electrically connected in parallel, and the banks being connected in parallel across feed line 17 leading from a source of current; the lamp banks c and d being connected in circuit through switches 18a and 18b, to serve as light sources respectively for the light sensitive elements e and f in the units A and B, for the separate or joint application of the aforesaid units.

Figure 2:
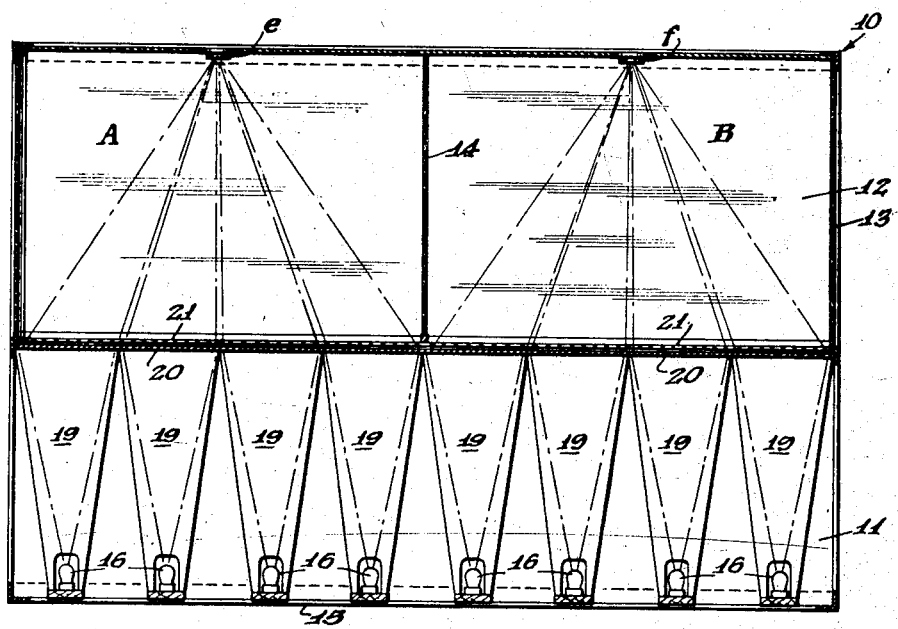
Figure 2 is a front elevation partly in section, taken along lines 2—2 of Figure 1.
Figure 3:
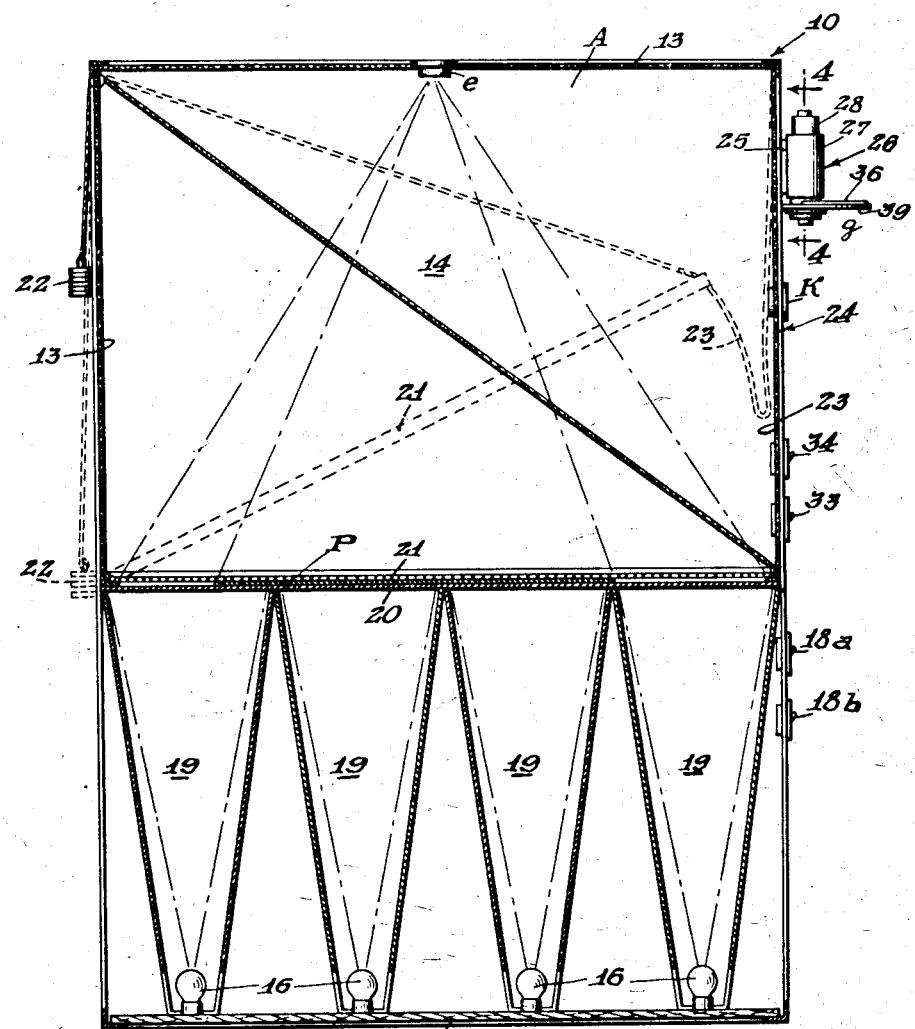
Figure 3 is an end elevation partly in section, taken along lines 3—3 of Figure 1.

Each lamp 16 is disposed within the narrow neck of a reflector 19, comprising an inverted hollow rectangular frusto-pyramid section, the peripheries of the bases of which are contiguous, see Figures 1 to 3, and which provide a support for table 20, formed of translucent glass or similar material and extending across cabinet 10 to form a base for the chamber 12 and the respective units A and B thereof.

The table 20 serves as a carrier or support for the product P, as for example, a hide or like material, of irregularly defined area, the latter being maintained in substantially flat position thereon by a screen 21, pivoted along one of its side edges to a wall of the cabinet, and controlled for angular movement to permit of insertion of the material to be measured by a pulley and counterbalance device 22, see Figure 3. An opaque curtain 23 fastened to the cabinet wall adjacent the feed door 24 is attached to the other side edge of the screen to minimize dispersion through slits or apertures in the feed door of light rays from the light source entering chamber 10.

Figure 7:
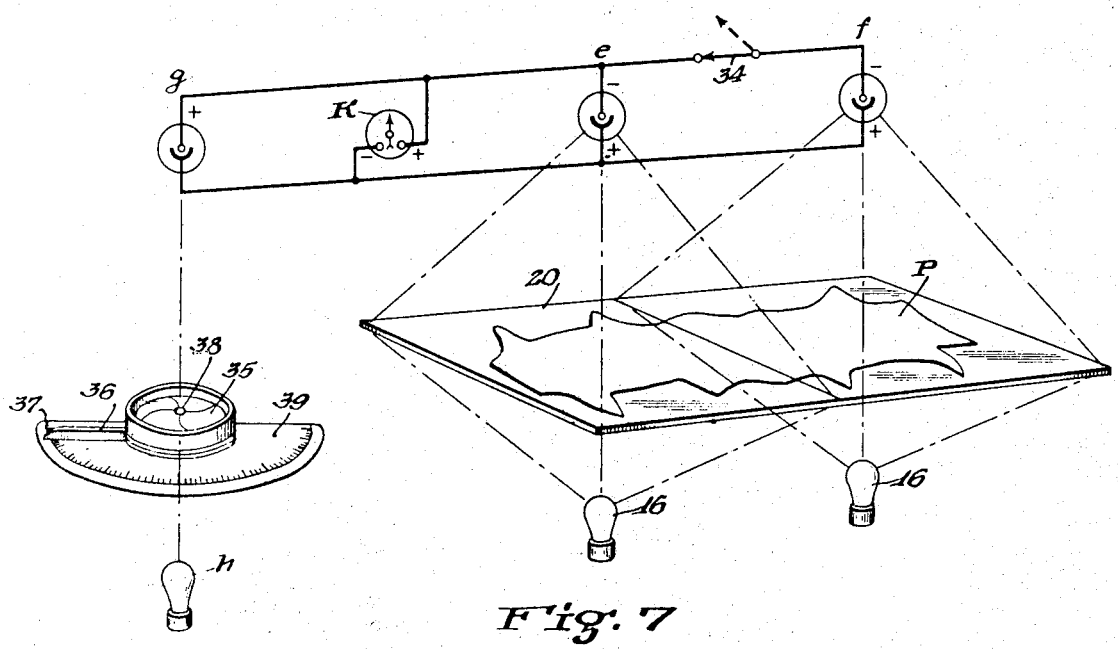
Figure 7 is a schematic view of the electrical circuit involved in the functioning of the light sensitive elements.

The light sensitive elements e and f for the units A and B, comprise photo-electric cells mounted centrally on the ceilings thereof, connected in parallel as shown in Figure 7, for co-joint application in the event both of the units are operated together, to measure a material of area greater than that of the table section of the individual units, or for individual or separate application of one or the other of units A or B, but in any event, whether the photo-electric cells are applied jointly or individually, their respective area ranges extend to the dividing curtain 14 between the units A and B.

Figures 4, 5:
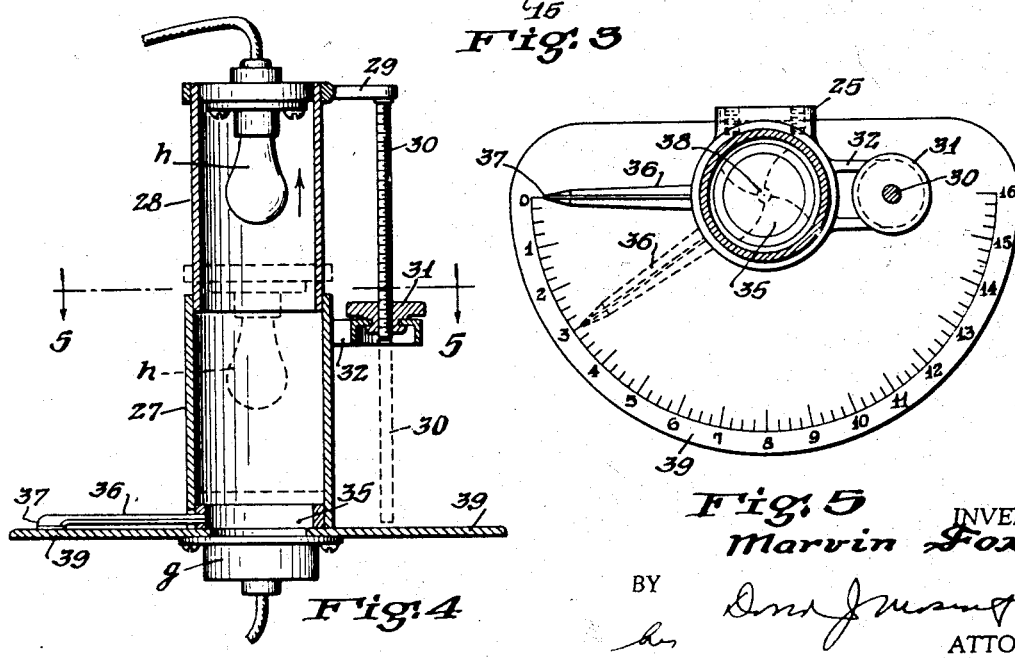
Figure 4 is a front elevation of the compensating device partly in section.
Figure 5 is a plan view of the indicator device on the compensating mechanism.

To cooperate with the photo-electric cell and light source assembly in the cabinet, and to provide the required balancing medium therefor, there is mounted on a bracket 25 disposed on exterior wall of the cabinet, a compensator unit 26. This unit comprises a collapsible casing (see Figures 1 and 4) formed of two concentric cylindrical shells 27 and 28 each closed at one end, and inverted with respect to one another, shell 28 being reciprocable within shell 27, which forms the body of the device. The shell 28 is provided with an arm 29 having a depending screw threaded rod 30, which is acted upon by threaded nut 31 mounted for rotation on bracket 32 extending laterally from fixed shell 27, to cause reciprocation of shell 28 with respect to the latter.

A photo-electric cell g is mounted at the base of shell 27, and a lamp h is mounted at the base of inverted shell 28; the lamp h being connected through switch 33 in feed line 17 (see Figure 6), while the photo-electric cell g is connected in series with photo-electric cell e of unit A; or in series with parallelly connected photo-electric cells e and f of units A and B upon closing of switch 34, as indicated in Figure 7.

A galvanometer K mounted on the exterior wall of the cabinet 10 is connected to bridge the circuit between photo-electric cell g of the compensator unit and cells e and f (of the units A and B) alone or connected in parallel as above.

Within the shell 27, and above the photo-electric cell g thereof, there is disposed a shutter or iris 35 (see Figures 5 and 7) having a control arm 36 and a pointer 37 attached thereto, whereby the exposure surface of photo-electric cell g may be varied by the actuation of arm 36 to control the luminous flux of light source h acting on photo-electric cell g, the amount of actuation of said iris or shutter and the degree of change of the aperture 38 defined thereby being indicated by the change in position of the pointer 37, on the calibrated dial 39 formed on a base of bracket 25.

Figure 6:
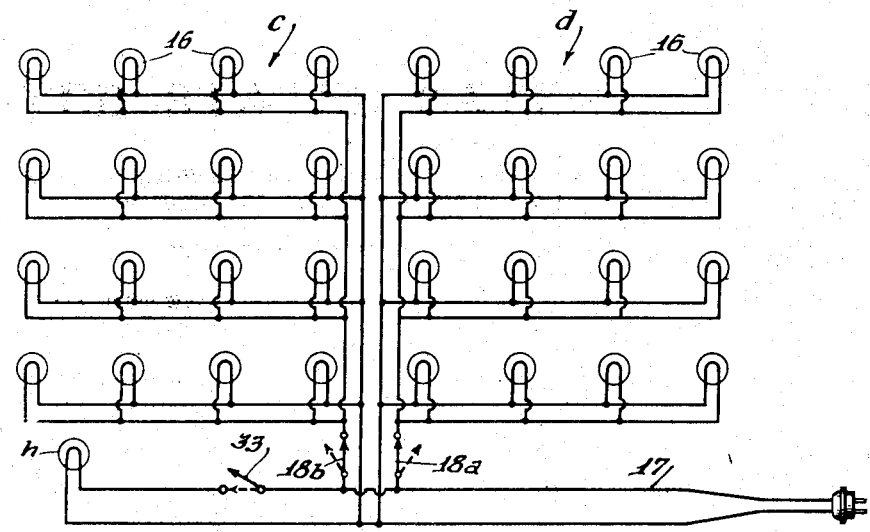
Figure 6 is a diagrammatical view of the electrical circuit for the light source.

In operation, with respect to an object of size to be measured in units A and B functioning jointly; referring to Figures 6 and 7, switches 18a, 18b, 33 and 34 are closed, developing luminous flux from lamp banks c and d, and from lamp h as light sources acting respectively on photo-electric cells e and f, in the measuring units, and g in the compensator unit; to pre-set the apparatus the shell 28 of the compensator unit is displaced, thus altering the luminous flux of lamp h with respect to photo-electric cell g, until the voltage developed by cells e and f on the one hand and g on the other, are equal and balanced, such condition being indicated by a zero reading of the galvanometer K.

The apparatus is now pre-set, and a hide or like material of irregular area is inserted onto table 20 through feed door 24 for measurement. Since there has been a blockage of light rays passing from lamp banks c and d towards cells e and f by the interposition of the hide therebetween, the luminous flux acting on cells e and f has been reduced and the voltage developed by these cells e and f, will be less than that developed by cell g, heretofore balanced thereagainst, hence, the galvanometer will swing away from the balanced or zero reading; thereupon, the iris or shutter 35 in the compensator unit 26 is actuated by control 36 to vary the aperture thereof, resulting in a reduction of the luminous flux from lamp h acting on cell g by the reduction of the exposure surface thereof until the galvanometer reading again reaches the original reading or value when the apparatus was pre-set.

Since the dial 39 on the bracket has been calibrated, the amount of displacement of the pointer 37 associated with the control 36 for the iris or shutter 35 represents the area of the hide or other material being measured.

Since the photo-electric cells e and f in the measuring units A and B and photo-electric cell g of the compensator unit have been initially balanced, no further adjustment of the light source h with respect to the cell g need be made, and successive measuring of the objects carried on through actuation only of the iris or shutter control for the cell g in the compensating chamber, to balance the effect developed by interposition of articles of varying area in units A and/or B.

In the event an article of small size is to be measured, the switch 18a or 18b is opened, likewise switch 34, leaving, for example, lamp bank c in the feed line and photo-electric cell e in circuit with photo-electric cell g. In such case the apparatus will require pre-setting through displacement of lamp h in the compensator unit, after which the operations relative to measurement are carried out as heretofore indicated.

It is obvious that various changes and modifications may be made to the details of construction without departing from the general spirit of the invention as set forth in the appended claims.

I claim:

1. In an area measuring apparatus of the class described, a sensitive element and a light source associated therewith, a second sensitive element and a light source associated therewith, said sensitive elements being electrically connected in series and capable of generating voltage under influence of luminous flux thereon, means for adjusting the light source associated with said second named sensitive element to cause the same to generate the same voltage as that of the first named sensitive element under influence of its source of light, and means associated with said second named sensitive element for varying the exposure surface thereof with relation to the luminous flux acting thereon from its source of light, and a translating device for indicating in units of area the amount of variation imparted by said last named means to said exposure surface.

2. In an area measuring apparatus of the class described, a photo-electric cell, a source of light spaced from said cell, a support for disposing material to be measured between the photo-electric cell and its source of light, a second photo-electric cell and a source of light adjustably spaced therefrom, an electrical circuit incorporating said photo-electric cells in series and a galvanometer bridged therebetween, means for adjusting the source of light with respect to said second named cell, whereby to produce a balance in the galvanometer, to pre-set the apparatus, said first named photo-electric cell being adapted upon the insertion of a length of material between it and its light source to alter the pre-set balance of said galvanometer, and means associated with said second named photo-electric cell for varying the exposure surface thereof to the luminous flux acting thereon from its light source, to reattain the pre-set balance of the galvanometer and a translating device for indicating in area units the amount of variation imparted by said last named means to the exposure surface of said second named photo-electric cell.

3. In an area measuring apparatus of the class described, a plurality of light sensitive elements, each having a light source associated therewith, said light sensitive elements having electrical generating properties, and being connected in series, a galvanometer bridging the circuit between said light sensitive elements, the luminous flux developed by the light source associated with the first named sensitive element being maintained at a constant value, means for displacing the light source for the second named light sensitive element to control the luminous flux therefrom acting on such sensitive element, whereby the electrical effects generated by said light sensitive elements and passing through the galvanometer may be balanced and the apparatus pre-set, a support between the first named sensitive element and its light source, upon which an object of irregular surface area to be measured may be interposed, whereby the electrical effects normally generated by such cell under influence of its light source are altered, and a shutter acting on said second named sensitive element for adjustably restricting the exposure surface area thereof acted on by the luminous flux from its light source, while the latter is maintained in pre-set position, to re-establish the balance in electrical effects generated by the respective light sensitive elements.

4. In an area measuring apparatus of the class described, a plurality of light sensitive elements, each having a light source associated therewith, said light sensitive elements having electrical generating properties, and being connected in series, a galvanometer bridging the circuit between said light sensitive elements, the luminous flux developed by the light source associated with the first named sensitive element being maintained at a constant value, means for displacing the light source for the second named light sensitive element to control the luminous flux therefrom acting on such sensitive element, whereby the electrical effects generated by said light sensitive elements and passing through the galvanometer may be balanced and the apparatus pre-set, a support between the first named sensitive element and its light source, upon which an object of irregular surface area to be measured may be interposed, whereby the electrical effects normally generated by such cell under influence of its light source are altered, and a shutter acting on said second named sensitive element for adjustably restricting the exposure surface area thereof acted on by the luminous flux from its light source, while the latter is maintained in pre-set position, to re-establish the balance in electrical effects generated by the respective light sensitive elements, and means associated with said shutter for directly indicating the degree of actuation thereof in area units.

5. In an area measuring apparatus of the class described, an electrically responsive light sensitive element having a source of luminous flux acting thereon, a second electrically responsive light sensitive element, and a different source of luminous flux acting thereon, an electrical circuit incorporating the sensitive elements, means for disposing material to be measured between the first light sensitive element and its source of luminous flux, and means for varying the luminous flux acting on the second named sensitive element to provide for a balance in the circuit of the electrical responses of the respective sensitive elements, and means for translating in area units the amount of variation of the luminous flux acting on the second named sensitive element.

6. In an area measuring apparatus of the class described, a photo-electric cell, a source of light spaced from said cell, a support for disposing material to be measured between the photo-electric cell and its source of light a second photo-electric cell and a source of light adjustably spaced therefrom, an electrical circuit incorporating said photo-electric cells in series and a galvanometer bridged therebetween, means for adjusting the source of light with respect to said second named cell, whereby to produce a balance in the galvanometer, to pre-set the apparatus, said first named photo-electric cell being adapted upon the insertion of a length of material between it and its light source to alter the pre-set balance of said galvanometer, and means associated with said second named photo-electric cell for varying the amount of luminous flux acting thereon from its light source, to reattain the pre-set balance of the galvanometer and a translating device for indicating in area units the amount of variation imparted by said last named means to the amount of luminous flux acting on said second named photo-electric cell.

MARVIN FOX.